United States Patent [19]
Findlay

[11] Patent Number: 5,889,530
[45] Date of Patent: Mar. 30, 1999

[54] METHOD AND APPARATUS FOR DYNAMICALLY PRESENTING GRAPHICAL REPRESENTATION OF INSTRUMENTATION

[75] Inventor: Roland Findlay, San Jose, Calif.

[73] Assignee: Tandem Computers, Inc., Cuptertino, Calif.

[21] Appl. No.: 616,028

[22] Filed: Mar. 14, 1996

[51] Int. Cl.⁶ .................................................. G06F 13/00
[52] U.S. Cl. ................................... 345/440; 395/200.31
[58] Field of Search .................................. 395/140, 806, 395/329, 335, 670, 672, 680, 682, 683, 200.02, 200.31, 200.32, 200.36, 200.54; 345/133, 440, 302, 329, 335

[56] References Cited

U.S. PATENT DOCUMENTS

| | | | |
|---|---|---|---|
| 5,432,932 | 7/1995 | Chen et al. | 395/683 |
| 5,519,863 | 5/1996 | Allen et al. | 395/673 |
| 5,557,747 | 9/1996 | Rogers et al. | 395/200.11 |
| 5,573,244 | 11/1996 | Mindes | 463/26 |
| 5,603,054 | 2/1997 | Theimer et al. | 395/826 |
| 5,629,498 | 5/1997 | Pollock et al. | 177/15 |

OTHER PUBLICATIONS

Sarukkai et al., "Automated Instrumentation and Monitoring of Data Movement in Parallel Program", *Parallel Processing, 1995 Symposium,* pp. 621–629.

Wang et al., "Intensive Help: A Knowledge–Based System for Intensive Care Units", *Computer–Based Medical Systems, 1992 Symposium,* pp. 335–344.

*Primary Examiner*—Stephen S. Hong
*Attorney, Agent, or Firm*—Philip H. Albert; Townsend and Townsend and Crew

[57] ABSTRACT

A system for dynamically graphically presenting a concept of interest related to the operation of a software target sub-system asks the sub-system to include changes in values relevant to the concept of interest in a telemetry stream propagated by the target sub-system. These values are held by receptors and collections of values relevant to the concept of interest are utilized to create renderings indicating characteristics of the concept of interest. A holder is provided for each value and a single value may be used to create different renderings thereby reducing the cost to the target subsystem. Whenever a value change is propagated each collection is notified so that the renderings are updated.

11 Claims, 8 Drawing Sheets

METHOD AND APPARATUS FOR DYNAMICALLY PRESENTING GRAPHICAL REPRESENTATION OF INSTRUMENTATION

BACKGROUND OF THE INVENTION

1. Field of the Invention.

The present invention relates generally to the control and management of multiple software sub-systems and, more particularly, relates to a computer program for monitoring changes in values or items in a keyed list propagated by a telemetry stream from a target sub-system.

2. Description of the Relevant Art.

Typically, it is necessary or desirable to monitor certain parameters relating to the operation of a target sub-system. For example, if the target sub-system were a transaction managing sub-system, some parameters of interest would be the number of transactions beginning each second and various threshold values.

In one prior art system, the target sub-system is queried when the value of a relevant parameter is to be monitored. The target sub-system reacts to the query by providing the value of the parameter at the time of the query.

Thus, each time the value is to be monitored the target sub-system must be queried so that the target sub-system provides information to be monitored on demand.

Another known method for monitoring the performance of a target sub-system is to poll the system at regular intervals to request values of parameters.

Both of the above-described methods require that the target sub-system interrupt its current task to provide the information requested. This interruption takes place regardless of whether any changes to the value of the monitored parameter have occurred. Conversely, if an important change takes place between requests the change will not be reported until the next request.

In a transaction managing sub-system, it is important to monitor the system at times of high activity. However, the very act of monitoring decreases the efficiency of the sub-system at a time of high activity.

Further, if the information being monitored is required by different users duplicate requests for the same information may be made.

SUMMARY OF THE INVENTION

The present invention is an improved system for monitoring values, or concepts of interest based on values, relating to the performance of a target sub-system, where the target sub-system controllably provides a telemetry stream that propagates changes in single values or of items in keyed lists.

According to one aspect of the invention, a method for monitoring an indicated value or concept of interest in a target sub-system includes the steps of asking the target sub-system to provide changes of values relevant to the concept to be monitored, collecting information related to changes of values relevant to the concept to be monitored, utilizing the collection of current values to create a rendering for indicating characteristics of the concept of interest, monitoring said telemetry stream to detect changes in values in said collection of values, and updating the rendering to reflect a change in a value in the collection of values.

According to another aspect of the invention, a holder is provided for each current value and all collections of values are notified when a value in the holder changes so that multiple renderings can be updated utilizing a single held value, thereby reducing the cost to the target sub-system monitoring aspects of its behavior.

According to another aspect of the invention, the system for monitoring is an object-oriented computer program that manipulates a related collection of objects. Interest in a conceptual entity is indicated by opening or activating a window including a rendering depicting characteristics of the concept of interest.

According to another aspect of the invention, the monitoring sub-system is a computer program that performs the above-described functions and operations.

Other features and advantages of the invention will become apparent in view of the following detailed description and appended drawings.

DESCRIPTION OF THE PREFERRED EMBODIMENTS

Figure 1:
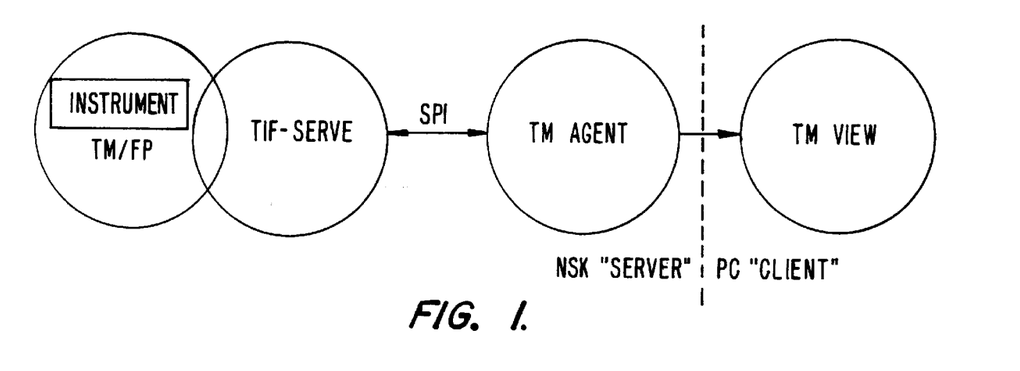
FIG. 1 is an overview of the environment of a preferred embodiment of the invention.

FIG. 1 is a system diagram depicting the environment and components of a preferred embodiment of the invention. In the preferred embodiment, the sub-system to be monitored is a massively parallel transaction manager (TM/MP). TM/MP consists of a number of interrelated software components, including a TIF(Tandem Instrument Facility) SERVE module. The TIFSERVE module communicates with a TM AGENT/TM VIEW (client/server) application by a non-privileged message based programmatic interface (SPI) sub-system. Multiple operating systems (each designated a NonStop Kernel [NSK]) are connected in an Expand Network. Each operating system has its own TM/MP sub-system and these TM/MP sub-systems can intercommunicate to share transactions. All the above described modules and applications are designed, manufactured, and distributed by Tandem Computers Incorporated of Cupertino, Calif.

Although not shown in FIG. 1, in the preferred embodiment TM/FP and TIFSERVE operate on a fault tolerant, parallel computer system. Such a fault tolerant system is described generally in, for example, in U.S. Pat. No. 4,817,091 to Katzman et al., which is herein incorporated by reference, or patent application Ser. No. 08/485,217, entitled "FAIL-FAST, FAIL-FUNCTIONAL, FAULT-TOLERANT MULTIPROCESSOR SYSTEM," both assigned to Tandem Computers Incorporated of Cupertino, Calif.

Included in the TM/MP module are instruments programmed by developers into relevant parts of the TM/MP code. Each instrument has a name and can report changes in an individual value, or, for a keyed list of values, can report additions to, deletions from, or changes to entries in the keyed list. Keys are byte strings and values can be simple numbers of several sizes and interpretations or byte strings. In either case, the byte strings are preceded by a count of the number of bytes that follow.

For example, a value that might be of interest is the number of transactions beginning each second. In this case, the value is represented as a 32 bit number interpreted in hundredths of transactions. A keyed list of values might be the set of files in an audit trail. In that case, the key is a byte string that makes each entry unique and the value is a bytes string containing various fields related to that entry.

The TIFSERVE module provides an interface to the instruments included in the TM/MP code. The view application ("the Viewer") is a client application that allows a user to indicate interest and then disinterest in conceptual entities related to the operating behavior of TM/MP. The agent application ("the Agent") is a server to the Viewer application and the TM Agent application communicates with TIFSERVE using the SPI messaging protocol.

Figure 1A:
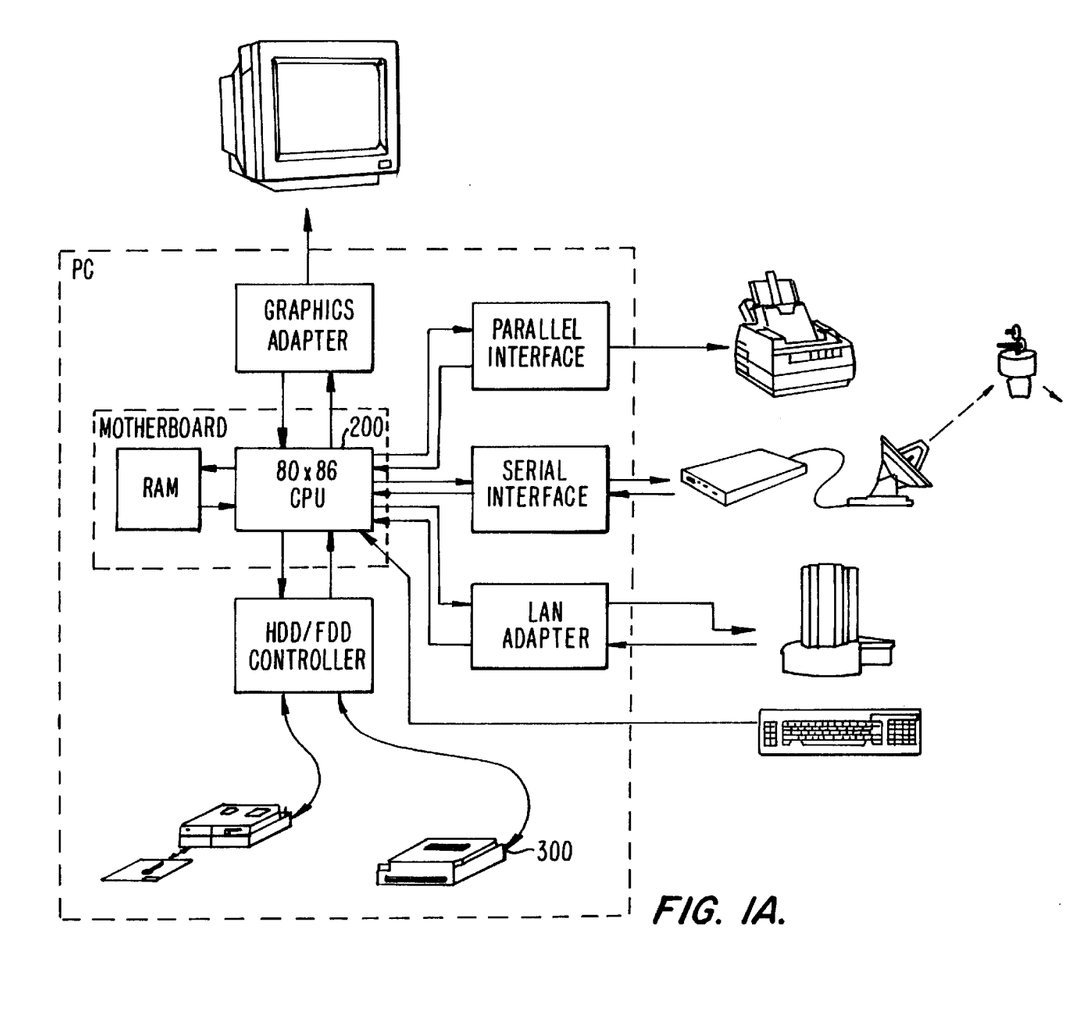
FIG. 1A is a block diagram of a PC.

In a preferred embodiment, Viewer operates on a PC as depicted in FIG. 1A. The PC includes CPU 200 for executing program instructions, a computer usable storage medium, such as a hard-disc drive 300, for storing program instructions and data and computer readable program code devices for effecting various function specified by Viewer.

A key factor of the instrumentation of TM/MP is that its impact on performance is minimized. As is known in the art, monitoring the behavior of a software module decreases the performance of the module because some the module's processing power must be directed to acquiring and reporting the information that is being monitored. Therefore, the operation of monitoring the behavior of a module exacts a "cost" in the performance of the module.

One common type of monitoring is polling where, at predetermined time intervals, a software routine is called to determine values indicating the status of information to be monitored. Polling is "expensive" in that it consumes a high cost in performance.

The behavior of TM/MP is most interesting during times of heavy load, which is also the time when the cost of monitoring must be minimized. The instrumentation of TM/MP cleverly minimizes the impact of instrumentation on performance. The monitoring program, Viewer, does not periodically poll TM/MP to obtain instrument values when looking for changes. Instead, Viewer merely identifies to TM/MP those changes in which it becomes interested and then disinterested as the behavior of TM/MP changes and the interests of Viewer's user change. Although Viewer may simultaneously use the same instrument value in different ways, there is no additional cost to TM/MP for the additional uses because Viewer itself handles this "fan out."

In a preferred embodiment Viewer is a windows application that runs on Microsoft Windows 3.x or NT. A graphical user interface is provided that allows the user to indicate interest or disinterest in relevant conceptual entities which indicate the behavior of the target sub-system updated by changes in values propagated by instrumentation in the target sub-system. The values are displayed and controls implemented utilizing windows graphics and control tools. The following description is directed to the Viewer client application. It will be understood by persons of skill in the art that the server Agent interacts with the client via RSC to respond to requests from the client to implement the procedures described below.

When the user opens a window, Viewer determines whether any instruments have become interesting because of references from that window and notifies TM/MP. Viewer determines the current values propagated by the relevant instruments when it creates the controls and graphics in the new window.

Viewer also dispatches changes in instrument keys and values to windows, controls and graphics for windows while they are open and determines the current values propagated by the relevant instruments when the user uncovers a window. When the user closes a window, Viewer determines whether any instruments are no longer of interest and notifies TM/MP.

Figure 2:
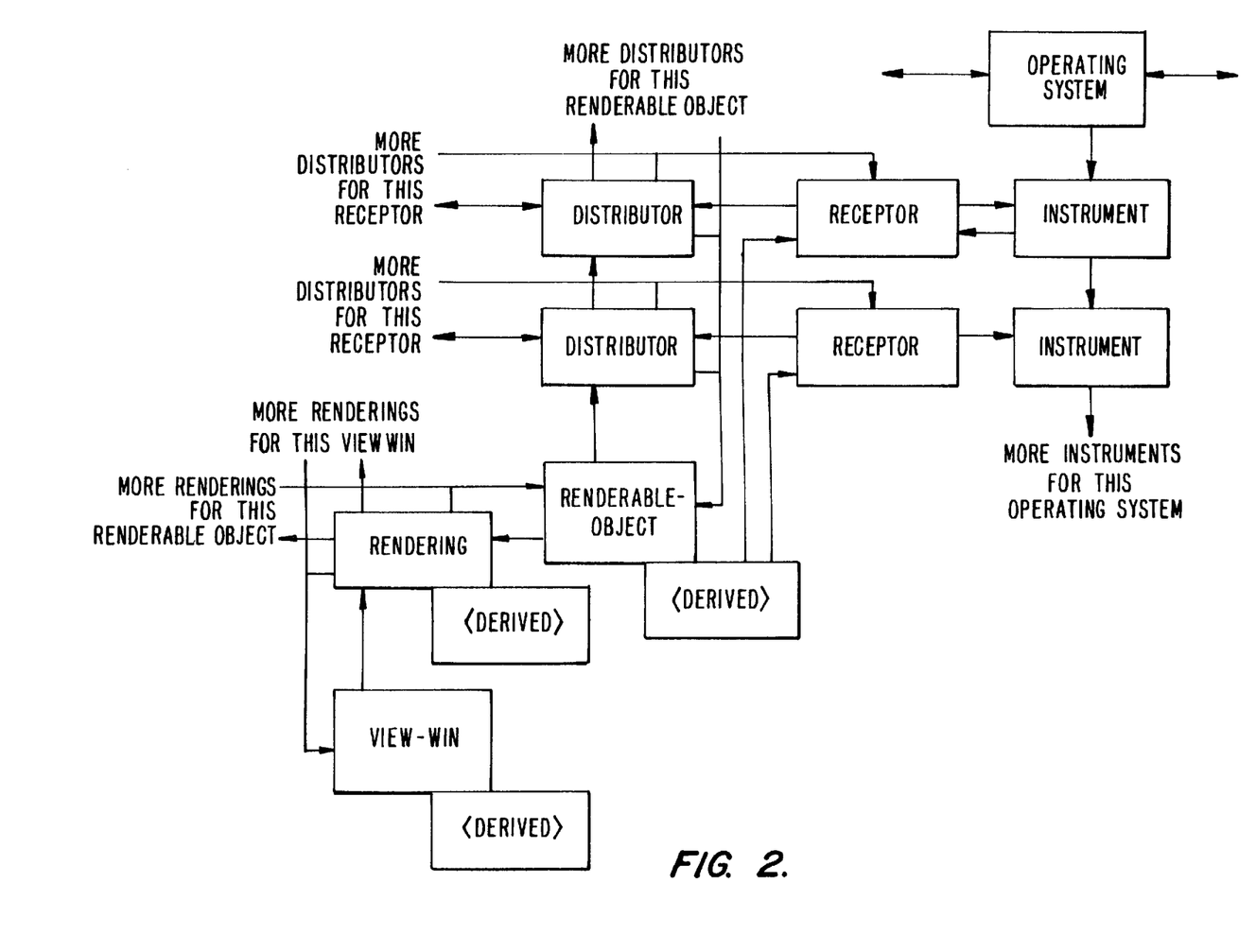
FIG. 2 is a schematic diagram showing the pointer relationships between objects utilized in a preferred embodiment.

In the preferred embodiment, Viewer manages the above-described scenarios by manipulating a related collection of C++ objects. An overview of these objects will now be described with reference to FIGS. 2–9. In FIG. 2, derived objects are depicted as a rectangle adjacent to an object including the legend <derived>. In FIG. 2 the arrows represent pointers to other objects. The flow of information is not depicted in the diagram.

ViewWin objects and RenderableObject objects are anonymous and have no identifier other than their memory address and can be located only by pointers. Derived objects for ViewWin and RenderableObject provide appropriate naming schemes for themselves, collecting the names together and providing lookup support as appropriate. Rendering, Receptor, and Distributor objects are mere plumbing and are always anonymous.

Instrument objects name themselves by a combination of TM/MP sub-system identifier and instrument name and provide appropriate lookup support. A Receptor object is named by the Instrument to which it is attached.

Linked lists organize instances of objects. The objects use singly-linked lists (SLLs) when the instances need to be traversed in only one order and random order insertion or destruction cannot occur. The objects use doubly-linked lists (DLLS) when the instances must be traversed in either director or random insertion or destruction is required.

DESCRIPTION OF Viewer OBJECTS

The following are detailed description of each of the objects utilized in the preferred embodiment.
Object: ViewWin The ViewWin object associates "look and feel." "Look" refers to the appearance of the window. "Feel" refers to the behavior and functionality to the user through specialized objects derived from ViewWin.

A window gets its look from both standard and custom graphical objects. The windowing system provides standard graphic objects such as push buttons and listboxes. Viewer itself provides custom graphical objects such as bargraphs and multi-column lists. A standard graphical resource editor provided by the windowing system vendor creates resource definitions that lay out both the standard and custom graphical objects. For example, the graphical resource editor supplied with XVT C++development system can be utilized.

The windowing system maintains a window's standard graphical objects and invokes member functions of the ViewWin object when the user activates these objects.

Viewer itself maintains custom graphical objects. When creating a window, Viewer reads its resource definitions into a structure and looks for static text objects whose names begin with a certain character. Viewer removes each of these from the resource structure and creates a corresponding Rendering object (see below). Once Viewer examines and processes all the resource structure, Viewer uses the result to create the window. This approach allows the use of the standard graphical resource editor to specify the layout of custom graphical objects unknown to it.

The windowing system invokes member functions in a ViewWin when the underlying window is created, needs to be redrawn, or is destroyed.

The ViewWin's behavior requires that its standard graphical objects be enabled, disabled, and updated according to the state of TM/MP. The ViewWin does this by creating ControlRenderings (see below).

A ViewWin has a pointer to a singly-linked list of all of its Renderings. The ViewWin traverses this list when the underlying window is created, needs to be redrawn, or is destroyed. This is a singly-linked list because all Renderings for a ViewWin exist for the lifetime of that ViewWin and are all destructed in sequence when the ViewWin is destructed.

Object: Rendering

Figure 3:
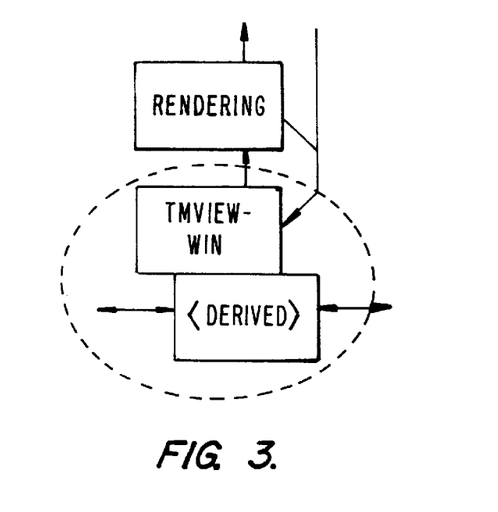
FIGS. 3–9 are diagrams of objects utilized in the preferred embodiment.
Figure 4:
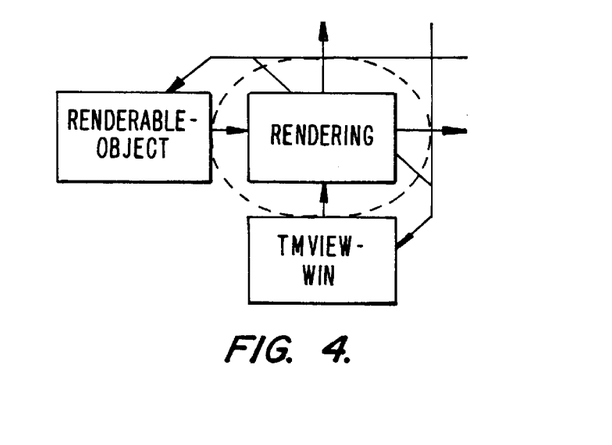
Figure 5:
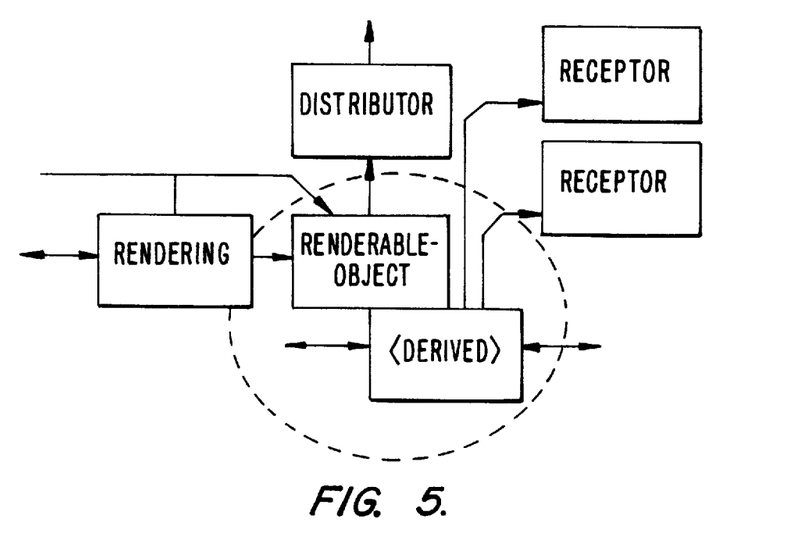
Figure 6:
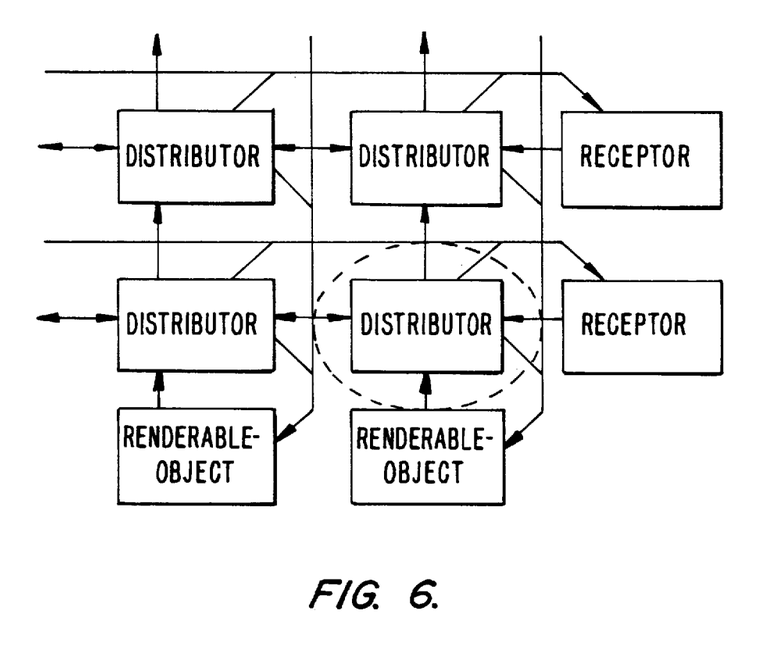
Figure 7:
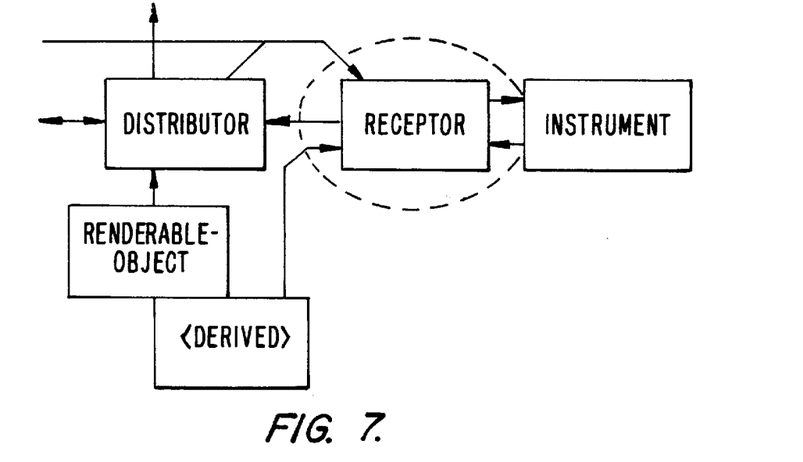
Figure 8:
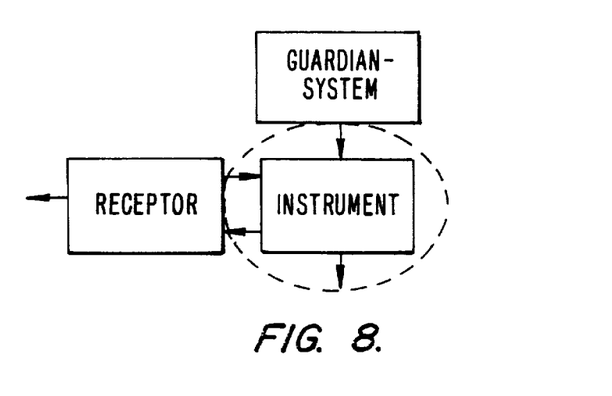
Figure 9:
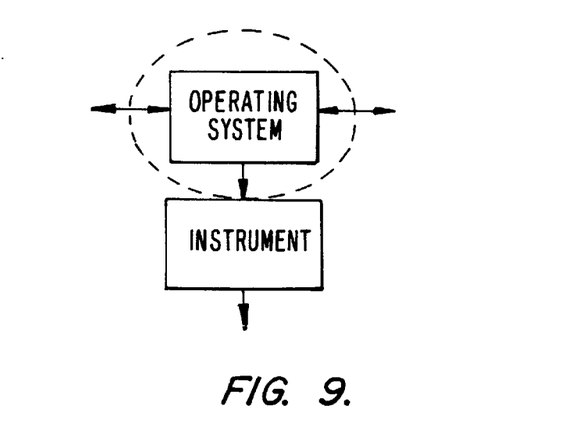

Referring to FIG. 3, the Rendering object provides a direct or indirect graphical representation of one associated RenderableObject object (see below).

A bargraph is an example of a direct graphical representation. Viewer draws a picture by using graphical primitives such as "draw line" or "fill rectangle" to represent some of the state of a TM/MP audit trail. Specialized drawings of various objects are derived from the Rendering class.

When a derived Rendering object is constructed, the derived Rendering asks a derived RenderableObject class to find, creating it if necessary, the appropriate derived RenderableObject object.

A Rendering object has a pointer to its ViewWin object. The Rendering object uses this pointer to its ViewWin object to perform the graphics operations needed to draw itself.

A Rendering object is in a singly-linked list of all Rendering objects for that ViewWin object (see above).

A Rendering object is in a doubly-linked list of all Rendering objects for its RenderableObject object. The RenderableObject object traverses the doubly-linked list to notify each of its Rendering objects when one of the RenderableObject object's instruments changes and the Rendering object might want to redraw itself. This is a doubly-linked list because the Rendering objects for a given RenderableObject object can be destructed in any order.

A Rendering object has a pointer in its RenderableObject object. This pointer is used when the rendering needs to obtain instrumentation values in order to draw itself.

Special Derived Objects

These special objects derived from the Rendering class are non-graphical. They do not draw themselves but notify other objects to update themselves in response to instrumentation changes.

ControlRenderings

Viewer must also be able change the states of controls that are drawn by the windowing system itself. ControlRendering class is a special object derived from Rendering. It does not cause Viewer to generate graphical operations. When the underlying object changes its state, the ControlRendering object invokes the updatecontrols member function of its corresponding ViewWin. The derived object implementation of that member function can then consider whether it should enable, disable, or otherwise alter the window's controls such as buttons or lists.

NullRenderings

Viewer must also be able change the states of objects that are used to model the behavior of TM/MP. Those objects are not relevant to the present invention except to mention the existence of the OperatingSystem objects that root the model for each TM/MP sub-system of interest.

NullRendering is a special object derived from Rendering. It does not cause Viewer to generate direct graphical operations. When the underlying TM/MP object changes its state, the NullRendering object invokes appropriate member functions for its associated OperatingSystem.

Object: RenderableObject

The RenderableObject object provides a mechanism for collecting together instrumentation relevant to a single conceptual entity. Viewer represents each different type of conceptual entity by an object derived from RenderableObject.

When a derived RenderableObject is constructed, it finds, creating if necessary, the appropriate derived Receptors (see below) for the relevant instrumentation.

TrailRenderableObject is one example of a derived RenderableObject. It collects together such information as the trail's currently used capacity and its overflow threshold.

Each derived RenderableObject class links together all of its instances so that the class knows which instances exist and can find them.

The derived RenderableObject class constructs an instance of itself when a Rendering is constructed and the required derived RenderableObject does not exist. Multiple Renderings can share the same derived RenderableObject.

An instance of a derived RenderableObject destructs itself when its last Rendering destructs.

RenderableObjects and Renderings are distinct so that a given object can have multiple different graphical representations.

Object: Distributor

The Distributor object allows a single Receptor to notify multiple RenderableObjects of changes in it.

Each time a RenderableObject attaches to a Receptor, the Receptor object constructs a Distributor to represent the Receptor-to-RenderableObject direction of that attachment. All of the Distributors for a given Receptor are linked together, with each Distributor pointing at one RenderableObject. This means that a Receptor itself does not have to take into account how many RenderableObjects are using it.

Since each derived RenderableObject knows exactly how many Receptors it will use and since it has a particular reason for using each one, the derived RenderableObject can include the appropriate set of pointers to represent each of its RenderableObject-to-Receptor relations.

Object: Receptor

Each Receptor provides a holder for the current value(s) of a single Instrument (see below).

There are objects derived from Receptor for each "shape" of instrument. "Shape" refers to the type and interpretation of the value, to whether or not the instrument is keyed, and, if so, to the interpretation of the key.

The derived Receptor constructs an instance of itself when a RenderableObject is constructed and the appropriate derived Receptor does not exist. Multiple RenderableObject instances can share the same instance of Receptor.

A Receptor destructs itself when its last RenderableObject destructs.

Object: Instrument

The Instrument object provides a mechanism for keeping track of the names and state of all instrumentation known to Viewer.

The Instrument keeps track of the correspondence between Instrument names, their numeric I.D.s, and Receptors. Instruments are used to cache the correspondence between Instrument name and Instrument identifier, even when no Receptor for the Instrument exists.

The TM/MP developer assigns the Instrument name at the time of implementing the Instrument in the TM/MP code. The Viewer implementor learns that name through some external communication such as a reference manual. For an Instrument to be monitored, Viewer asks TM/MP to look up and return the numeric I.D. corresponding to its name. Viewer then asks TM/MP to add the Instrument by specifying its numeric I.D. Once it has added the Instrument, TM/MP sends value changes in a telemetry stream. TM/MP identifies each value change by the Instrument's numeric I.D. Viewer can monitor multiple TM/MP sub-systems at the same time. Although a given Instrument will have the same name in all TM/MP sub-systems, its numeric I.D. may be different.

Viewer uses the Instrument object to route information from the telemetry stream to each appropriate Receptor.

All Instruments for an OperatingSystem object (see below) are linked together and are identified by name. There are no derived objects.

The OperatingSystem object constructs an Instrument when a Receptor is constructed and the required Instrument does not exist. A single Receptor can use a given Instrument.

A given Instrument will continue to exist even when no Receptor for it exists. This avoids the overhead of looking up its name after the first time Viewer constructs a Receptor.

Viewer destructs all Instruments for a given TM/MP sub-system when the user deletes that sub-system from Viewer.

Object: OperatinqSystem

The OperatingSystem anchors Viewer's internal model of a NSK system running TM/MP. The internal model includes the objects detailed in this paper as well as others beyond its scope.

When instrumentation events arrive in the telemetry stream they are marked with the originating sub-system and Instrument. The application framework asks the OperatingSystem class to find the right OperatingSystem. The application framework then asks that OperatingSystem to find the appropriate Instrument.

DESCRIPTION OF Viewer SCENARIOS

The following scenarios illustrate the interaction of Viewer with the above-described objects during the creation of a Viewer window, Viewer window exposure, the monitoring of a change of behavior of TM/MP, and the destruction of a Viewer window. The following descriptions refer to FIGS. 2–9.

Scenario: ViewWin creation

When the user requests that a window be activated, the derived ViewWin class looks for that particular derived ViewWin.

If that derived ViewWin already exists, the derived ViewWin class brings it to the front and that's all.

If the derived ViewWin does not exist, the derived ViewWin class constructs it and tells it to read in the resource definitions created by the UI designer.

The UI Designer is the person who uses the standard graphical resource editor for window system elements such as windows and dialogs. This concept allows such elements to be defined outside the application code and given an I.D. for the code to reference. For instance, the contents of a button and its location in a window need not be coded into the program.

The derived ViewWin looks for static text resources whose text begins with the ">" character.

The derived ViewWin removes each such static text resource from the resource definitions. The remainder of the static text consists of a name and an optional argument string. The name is used to select a derived Rendering manufacturer and the argument string, if present, is passed to it.

There is a derived Rendering manufacturer for each of the derived Renderings that the UI designer can insert into Viewer's windows.

There are five base classes for these Rendering manufacturers:

DesignRendering is the base class for manufacturers of Renderings that are global to Viewer. These refer to no particular OperatingSystem.

SystemDesignRendering is the base class for manufacturers of Renderings that refer to a particular OperatingSystem.

ATDesignRendering is the base class for manufactures of Renderings that refer to a particular audit trail of a particular OperatingSystem.

SysQualDesignRendering is the base class for manufacturers of Renderings that refer to a particular textually-named part of a particular OperatingSystem.

TIFDesignRendering is the base class for manufacturers of Renderings that refer to a particular instrument of a particular OperatingSystem.

Classes derived from TIFDesignRendering manufacture stock Renderings of arbitrary non-keyed instruments of a particular OperatingSystem. The instrument is specified by name in the argument in the text resource.

The stock renderings allow the instrument to be rendered as an integer, a number with two decimal places, or a bargraph superimposed on a stripchart. This feature allows the UI designer to add instrument renderings to Viewer merely by utilizing the standard graphical resource editor to work with Viewer's resource definitions and without having access to the source code of the Viewer program.

The derived Rendering manufacturer constructs the appropriate derived Rendering using the geometry information for the original resource entry.

The derived Rendering asks the appropriate derived RenderableObject class for the appropriate object.

If the appropriate derived RenderableObject is not found, the derived RenderableObject class constructs the appropriate object.

The derived RenderableObject asks the derived Receptor class to attach the appropriate Receptor(s) to it and saves pointers to the Receptor(s).

If an appropriate derived Receptor does not exist, the derived Receptor class constructs it.

The Receptor asks the appropriate OperatingSystem to connect it with the appropriate Instrument.

The OperatingSystem looks for the appropriate Instrument.

If the appropriate Instrument does not exist, the OperatingSystem constructs it.

The Instrument adds itself to the list of instruments for the OperatingSystem.

If the Instrument's name has not been converted to an instrument identifier, the Instrument asks TM/MP to do so.

If the Instrument has not been added to those that TM/MP is monitoring for this Viewer, the Instrument asks TM/MP to do so.

The OperatingSystem saves a pointer to the Receptor in the Instrument.

The Receptor saves a pointer to the Instrument. The Receptor class constructs a Distributor.

The Distributor adds itself to the list of all Distributors for the Receptor and to the list of all Distributors for the RenderableObject.

The Rendering adds itself to the RenderableObject's list of Renderings.

The derived ViewWin creates the actual window.

Scenario: ViewWin exposure

Viewer tells the derived ViewWin that part or all of it has become visible and needs to be redrawn. The part needing to be redrawn is specified as a rectangular area of the window.

The derived ViewWin traverses its list of Renderings looking for those whose areas are contained in or intersect with the rectangle needing to be redrawn.

The derived ViewWin tells each the appropriate Renderings to render itself.

ControlRenderings and NullRenderings do nothing.

Any other derived Rendering uses its pointer to its derived RenderableObject to obtain the information to issue the appropriate graphical operations to render itself.

The derived RenderableObject uses its pointer(s) to its derived Receptor(s) to obtain the instrumentation values that it uses to answer queries from its derived Rendering.

Scenario: Change of TM/MP behavior

While handling the event stream arriving in Viewer, Viewer encounters a telemetry event.

Viewer extracts the sub-system number and asks the OperatingSystem class to find the specific OperatingSystem for that number.

Viewer extracts the instrument identification and asks the OperatingSystem to find the appropriate Receptor.

The OperatingSystem looks through its Instruments until it finds the one that matches the instrument identification.

The OperatingSystem passes back the Receptor that the Instrument points to.

Viewer tells the derived Receptor to extract the rest of the telemetry event.

The derived Receptor extracts its new value and sets itself to that value.

The Receptor traverses its list of Distributors.

For each of its Distributors, the Receptor tells the associated RenderableObject that the Receptor has changed.

The RenderableObject traverses its list of Renderings and tells each Rendering that the Receptor has changed.

Each derived Rendering takes the appropriate action.

ControlRendering tells its derived ViewWin to update the settings of its controls.

A NullRendering tells its OperatingSystem to update its model of TM/MP.

Any other Rendering redraws itself in its derived ViewWin.

Notes

The specialized knowledge that a RenderableObject has about what instrumentation it needs is implemented in an object derived from RenderableObject.

The specialized knowledge that a Rendering has about how it is to be drawn is implemented in an object derived from Rendering.

The derived Rendering gathers its new state information by querying its derived RenderableObject for information.

A simple Rendering of a RenderableObject using a single Receptor need not even query the RenderableObject because the notification that the Receptor changed included a pointer to the Receptor.

A SPECIFIC EXAMPLE

Figure 10:
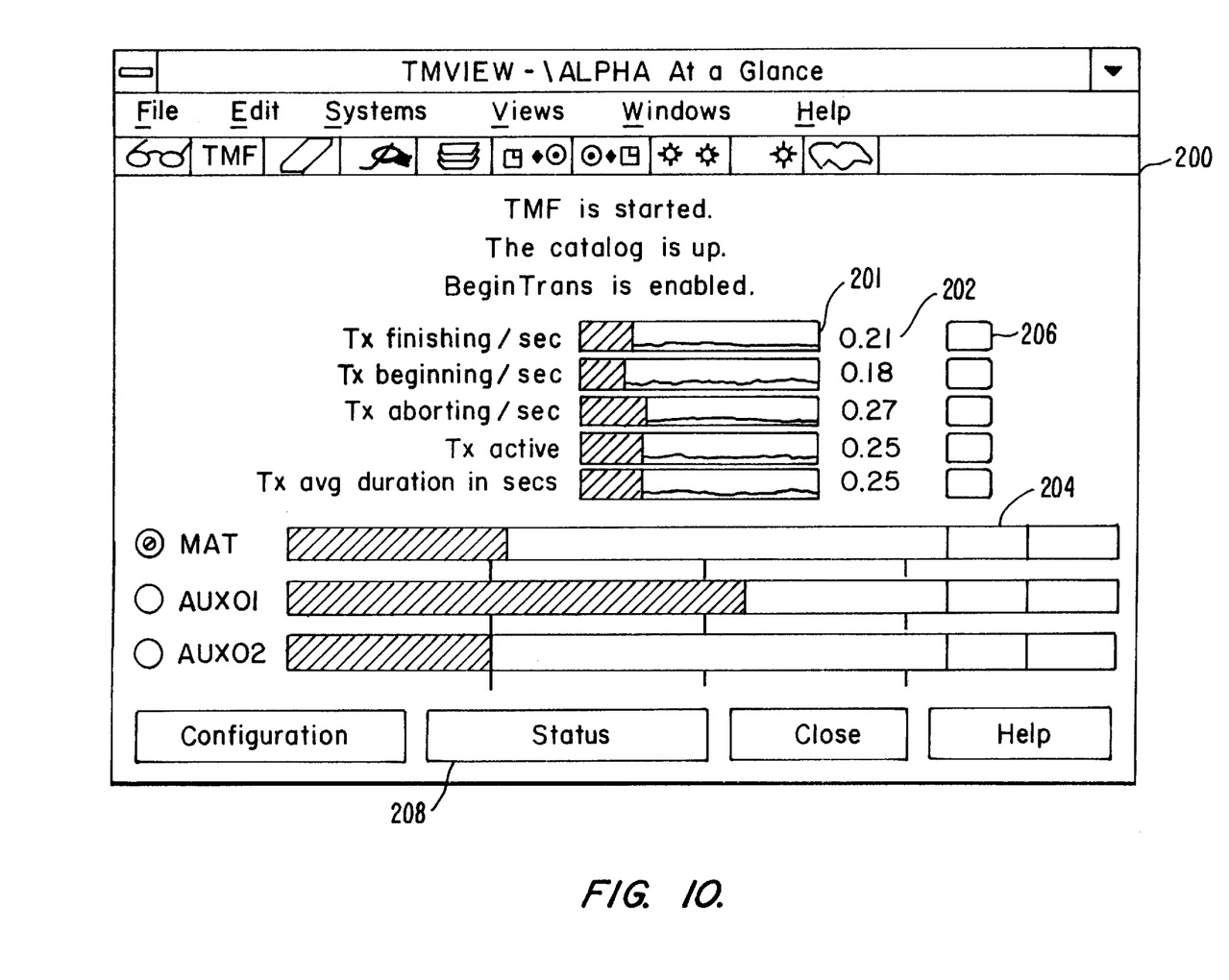
FIGS. 10–12 are diagrams of exemplary windows created by a preferred embodiment.
Figure 11:
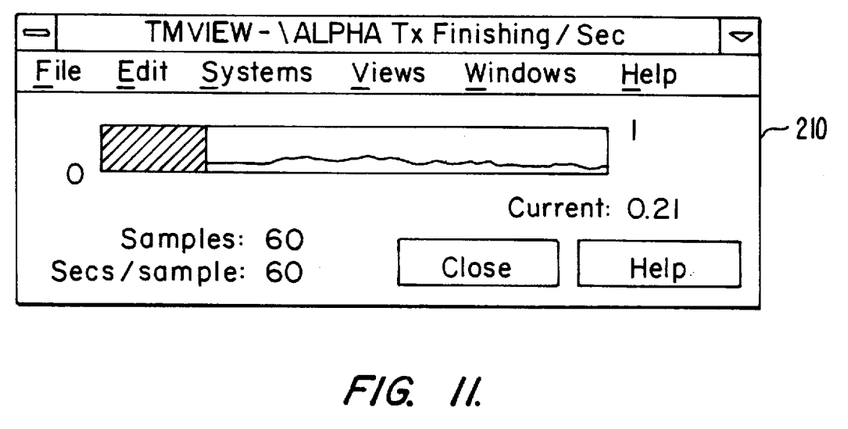
Figure 12:
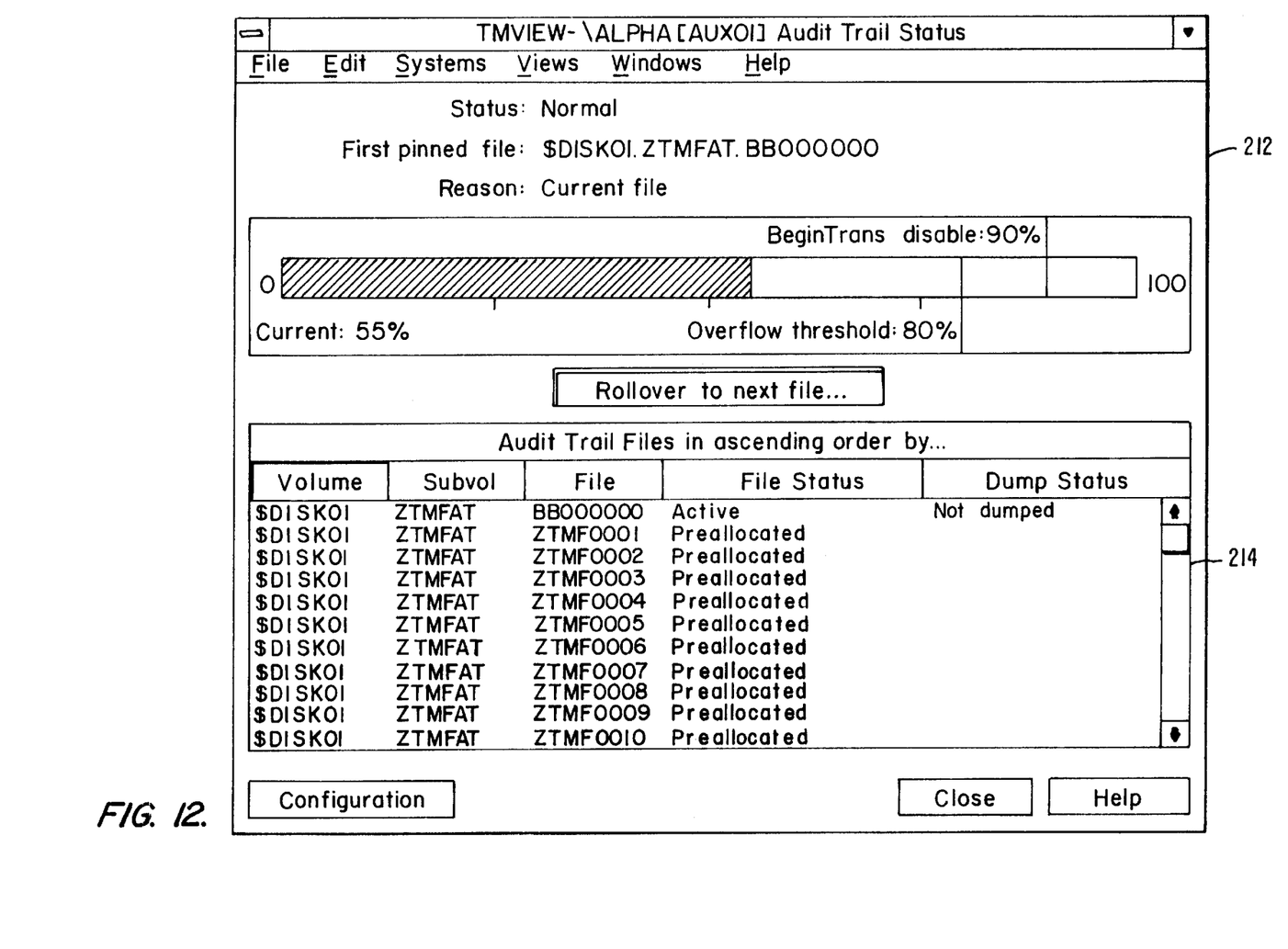

FIGS. 10–12 depict windows and actual renderings created in a preferred embodiment of the invention.

Referring to FIG. 10, an "At a Glance" window 200 is depicted which includes stock Rendering objects, depicting of arbitrary non-keyed values, manufactured from classes derived from the base TIFDesignableRendering class. For example, the values supplied by the "transaction finishing" instrument are rendered both as a bar graph 201 and a number with two decimal places 202. Values related to the status of an audit trail are rendered as a bar graph superimposed over a strip chart 204.

Additional windows may be opened by activating the button 206 next to the Tx beginning bar graph 201 or by activating the Status button 208.

FIG. 11 depicts the "Tx Finishing" window 210 created when the button 206 is activated. The steps for creating this window are described above in create window scenario. In this case, the RenderableObject, Receptors, and Instrument objects required to create the window are already in existence because the same information was displayed in the "At a Glance" window depicted in FIG. 11.

FIG. 12 depicts the "Audit Trail Status" window 212 opened when the Status button 208 in the "At a Glance" window is activated. In addition to the bar graph superimposed over a strip chart rendering 204, a custom graphical object in the form of a multi-column list 214 is included in the window.

Figure 13:
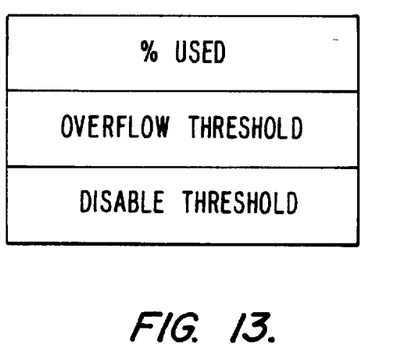
FIG. 13 is a schematic diagram of a RenderableObject object related to the exemplary windows depicted in FIGS. 10–12.

The RenderableObject object utilized by the rendering 204 is depicted in FIG. 13. The renderable object collects instrumentation values including percent of the audit file used, overflow threshold, and begin transaction disable level. As described above, Instrument objects route these values in the telemetry stream to the appropriate Receptor objects which hold the values. A Distributor object notifies the appropriate RenderableObject object of changes in the values held in the Receptor object.

What is claimed is:

1. In a computer system including an operating system and a target sub-system comprising a number of interrelated software components, with the target sub-system including instrumentation for controllably propagating values relevant to behavior of the target sub-system in a telemetry stream, a monitoring system for presenting a graphical representation an aspect of the behavior of the target sub-system of interest to a user, said monitoring system comprising:

a collection of objects comprising an Object:Win, an Object:Rendering for providing a dynamic graphical representation indicating characteristics of the aspect of the behavior being monitored, an Object:RenderableObject, for collecting together current values relevant to the aspect being monitored; an Object:Distributor for notifying multiple Object:RenderableObjects of changes in a value in the telemetry stream, an Object:Receptor for providing a holder for a single current value, an Object:Instrument for keeping track of names and states of all information in the target sub-system known to the monitoring system, and an Object:OperatingSystem for modeling an operating system running the target subsystem, with each object being an instance of a corresponding object class which is a software implementation of an object type and with corresponding derived objects being instances of derived classes;

and with the monitoring system performing the steps of:
constructing the Object:Win with the Win class, when a user requests that window be activated, and with the Win class telling said Object:Win to read in the resource definitions created by a UI designer, to look for static text resources whose text begins with specified character, to remove each such static text resource from the resource definitions, to select a derived Object:Rendering manufacturer and an argument string, if present, is passed to said Object:Rendering manufacturer where the derived Object:Rendering manufacturer constructs the appropriate derived Object:Rendering using geometry information from the resource definition;

the derived Object:Rendering asks the appropriate derived RenderableObject class for the appropriate Object:RenderableObject, and if the appropriate Object:RenderableObject is not found, the RenderableObject class constructs an appropriate derived Object:RenderableObject;

the Object:RenderableObject asks the derived Receptor class to attach the appropriate Object:Receptor to the Object:RenderableObject and to save pointers to the Object:Receptor, and if the appropriate Object:Receptor does not exist, the derived Receptor class construct the appropriate Object:Receptor;

the Object:Receptor asks the appropriate Object:OperatingSystem to construct the appropriate Object:Instrument, and if the appropriate Object:Instrument does not exist, the Object:OperatingSystem constructs the appropriate Object:Instrument;

the Object:OperatingSystem searches for the appropriate Object:Instrument, and if the appropriate Object:Instrument does not exist, the Object:OperatingSystem constructs the appropriate Object:Instrument with the Object:Instrument adding itself to the list of Object:Instruments for the Object:OperatingSystem;

if the Object:Instrument's name has not been converted to an instrument identifier the Object:Instrument asks the target sub-system to do so;

if the Object:Instrument has not been added to those that monitoring system is monitoring for this active window the Object:Instrument asks the target sub-system to do so;

the Object:Instrument routes changes in a particular value provided in a telemetry stream to the appropriate Object:Receptor;

with the Object:OperatingSystem saving a pointer to the Object:Receptor in the Object:Instrument;

with the Object:Receptor saving a pointer to the Object:Instrument;

with the Object:Receptor class constructing a Object:Distributor;

with the Object:Distributor adding itself to the list of all Object:Distributors for the Object:Receptor and to the list of all Object:Distributors for the Object:RenderableObject;

with the Object:Rendering to add itself to the Object:RenderableObject's list of Object:Renderings;

creating, with the Object:Win, an actual window.

2. The monitoring system of claim 1 wherein:

said Object:Rendering requests values relevant to presenting a graphical rendering of said conceptual entity from said Object:RenderableObject and provides a graphical representation of said Object:RenderableObject;

said Object:Instrument sends changes to a value relevant to the conceptual entity in a telemetry steam;

said Object:Receptor holds a current value of said relevant value;

said Object:Distributor notifies said Object:Renderable object of changes to the relevant value held in said Object:Receptor and allows said Object:Receptor to notify multiple Object:RenderableObject of changes in it; and said Object:RenderableObject collects values relevant to said conceptual entity to pass to said Object:Rendering.

3. The monitoring system of claim 1 further comprising:

in response to a user indicating that a window should be closed;

the Object:Win traverses its list of Object:Renderings and delinks and deletes each Object:Rendering in its list;

as each Object:Rendering is deleted and destructing, it delinks itself from its Object:RenderableObject, and, if a deleted Object:Rendering determines that its linked Object:RenderableObject has no remaining Object:Renderings linked thereto, the deleted Object:Rendering deletes the Object:RenderableObject;

as it is deleted and destructing, the Object:RenderableObject traverses its list of Object:Distributors and delinks and deletes each Object:Distributor in its list;

as each Object:Distributor is deleted and destructing, it delinks itself from its Object:Receptor, and, if a deleted Object:Distributor determines that its linked Object:Receptor has no remaining Object:Distributors linked thereto, the deleted Object:Distributor deletes the Object:Receptor;

as it is deleted and destructing, the Object:Receptor tells the Object:OperatingSystem to detach its linked Object:Instrument for the Object:Receptor;

the Object:OperatingSystem clears the pointer from the Object:Instrument back to the Object:Receptor; and the Object:Instrument asks the target subsystem to remove it from those that the target subsystem in monitoring for the current window but the Object:Instrument is not deleted unless the corresponding Object:OperatingSystem is deleted to allow conversion of instrument names to instrument identifiers to be cached for re-use.

4. In a computer system that includes a display, an operating system and a target sub-system comprising a number of interrelated software components, a method for presenting a dynamic graphical representation of values of interest, in response to user input, based on values included in a telemetry stream propagated from a target sub-system, with the target sub-system including instrumentation for controllably propagating changes of values relevant to the behavior of the target sub-system in a telemetry stream, said method comprising the steps of:

creating, in response to user input, a window in the display representative of textual resources corresponding to a plurality of monitored aspects of the target sub-system;

selecting at least one of the plurality of monitored aspects for dynamic graphical representation;

deriving a current value of the selected monitored aspect when the current value is found in the target sub-system, otherwise if not found, constructing a current value by gathering geometry information associated with textual resources corresponding to a selected monitored aspect;

attaching to a receptor means the derived or constructed current value of the selected monitored aspect;

attaching to a receptor means the derived or constructed current value of the selected monitored aspect;

saving in a memory a pointer to the receptor means having an attached current value of the selected monitored aspect;

graphically representing, in the window, the current value of the selected monitored aspect from the memory;

searching, at a predetermined frequency, for a current state of the current value of the selected monitored aspect, otherwise if not found constructing a current state from information associated with the current value of the selected monitored aspect;

routing successive changes in the current state of the current value of the selected monitored aspect to the memory, the changes being routed by the telemetry stream; and graphically representing, in the window, the successive changes in the current state of the current value of the selected monitored aspect from the memory.

5. The method of claim 4 further comprising:

providing a textual identifier to each current state found or constructed, the identifier being graphically represented in the window; and adding the textual identifier to the textual resources in the window.

6. The method of claim 4 wherein the routing step further comprises updating the current state of the current value of the selected monitored aspect by incrementing or decrementing the memory by a value corresponding to the successive changes in the current state; and dynamically displaying in the window a graphical representation of the updated current state.

7. The method of claim 4 further comprising:

in response to a user request that the window be closed, traversing the telemetry stream to signal the monitored aspect that its current value will no longer be monitored;

removing from the memory the pointer to the receptor means and thereby purging from the receptor means of the current value of the selected monitored aspect; and deleting the window from the display.

8. In a computer system including an operating system and a target sub-system comprising a plurality of interrelated software components, with the target sub-system including instrumentation for controllably propagating values relevant to behavior of the target sub-system in a telemetry stream, a computer monitoring system for presenting a graphical representation of an aspect of the behavior of the target sub-system of interest to a user, comprising:

a processor;

a display coupled to the processor;

computer-readable media coupled to the processor for hosting the operating system, the operating system including:

code that directs the processor create, in response to user input, a window in the display representative of textual resources corresponding to a plurality of monitored aspects of the target sub-system;

code that directs the processor to select at least one of the plurality of monitored aspects for dynamic graphical representation;

code that directs the processor to derive a current value of the selected monitored aspect when the current value is found in the target sub-system, otherwise if not found, construct a current value by gathering geometry information associated with textual resources corresponding to a selected monitored aspect;

code that directs the processor to attach to a receptor means the derived or constructed current value of the selected monitored aspect;

code that directs the processor to save in a memory a pointer to the receptor means having an attached current value of the selected monitored aspect;

code that directs the processor to graphically represent, in the window, the current value of the selected monitored aspect from the memory;

code that directs the processor to search, at a predetermined frequency, for a current state of the current value of the selected monitored aspect, otherwise if not found construct a current state from information associated with the current value of the selected monitored aspect;

code that directs the processor to provide a textual identifier to each current state found or constructed, the identifier being graphically represented in the window;

code that directs the processor to add the textual identifier to the textual resources in the window;

code that directs the processor to route successive changes in the current state of the current value of the selected monitored aspect to the memory, the changes being routed by the telemetry stream; and code that directs the processor to graphically represent, in the window, the successive changes in the current state of the current value of the selected monitored aspect from the memory.

9. The computer monitoring system of claim 8 further comprising:

code that directs the processor to provide a textual identifier to each current state found or constructed, the identifier being graphically represented in the window; and code that directs the processor to add the textual identifier to the textual resources in the window.

10. The computer monitoring system of claim 8 wherein the routing code further comprises code that directs the processor to update the current state of the current value of the selected monitored aspect by incrementing or decrementing the memory by a value corresponding to the successive changes in the current state; and code that directs the processor to dynamically display in the window a graphical representation of the updated current state.

11. The computer monitoring system of claim 8 further comprising:

in response to a user request that the window be closed, code that directs the processor to traverse the telemetry stream to signal the monitored aspect that its current value will no longer be monitored;

code that directs the processor to remove from the memory the pointer to the receptor means and thereby purging the receptor means of the current value of the selected monitored aspect; and code that directs the processor to delete the window from the display.

* * * * *